March 9, 1948. F. L. LAWRENCE 2,437,430
HYDRAULIC CLUTCH CONTROL
Filed Oct. 29, 1945 3 Sheets-Sheet 1

INVENTOR
FRANK LENDRUM LAWRENCE
ATTORNEY

March 9, 1948.  F. L. LAWRENCE  2,437,430
HYDRAULIC CLUTCH CONTROL
Filed Oct. 29, 1945   3 Sheets-Sheet 2

INVENTOR
FRANK LENDRUM LAWRENCE
Ernest E. Carver
ATTORNEY

March 9, 1948. F. L. LAWRENCE 2,437,430
HYDRAULIC CLUTCH CONTROL
Filed Oct. 29, 1945 3 Sheets-Sheet 3

INVENTOR
FRANK LENDRUM LAWRENCE
ATTORNEY

Patented Mar. 9, 1948

2,437,430

UNITED STATES PATENT OFFICE 2,437,430

HYDRAULIC CLUTCH CONTROL

Frank Lendrum Lawrence, Vancouver, British Columbia, Canada

Application October 29, 1945, Serial No. 625,189

5 Claims. (Cl. 192—86)

My invention relates to improvements in hydraulic clutch controls which are particularly adapted for use in reversing gears of transmissions.

The objects of the invention are to provide a piston of such area that the oil pressure to operate the clutches is very low; to provide a hydraulic cylinder for operating the clutches which is concentric with the flywheel or drive shaft which remains completely filled with oil and free from air pockets irrespective of the direction of flow to said cylinder, so that erratic operation of the clutches is eliminated; to provide means whereby the oil pressure on both sides of the piston becomes equallized as soon as the control lever is set to neutral position to ensure against either clutch dragging, and to provide an automatic means for purging the cylinder of any air which may be occluded in the oil or otherwise carried into the cylinder.

The invention contemplates a disk or flywheel having a hub supporting a piston and a hydraulic cylinder movable thereon and clutch plates adapted to be gripped by members carried by the disk and the cylinder, as will be more fully described in the following specification and shown in the accompanying drawings, in which.

Figure 2:
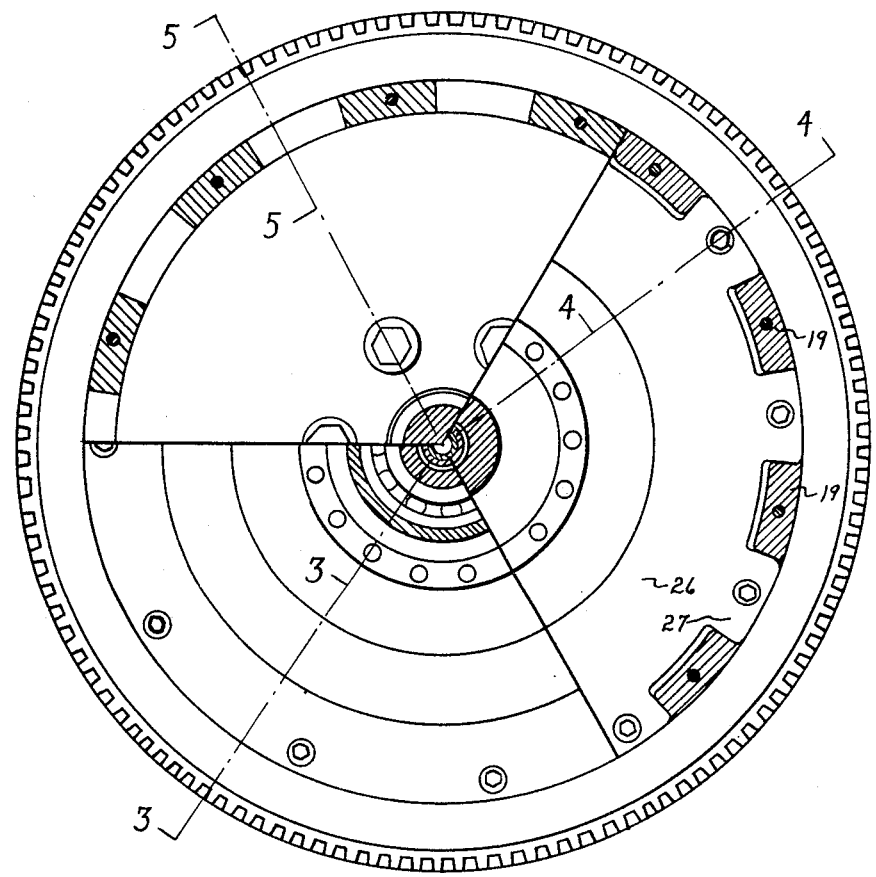
Fig. 2 is a transverse sectional view taken on the planes 3CL, 4CL and 5CL of Figure 1.
Figures 3, 4, 5:
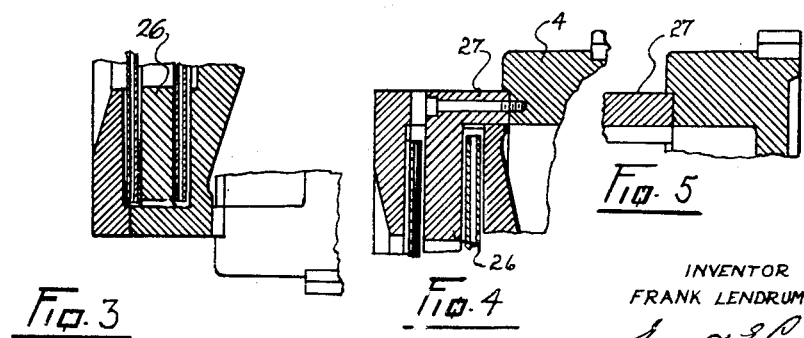

Figs. 3, 4, and 5 are sections taken respectively on the lines 3—3, 4—4 and 5—5 of Figure 2.

Figure 6:
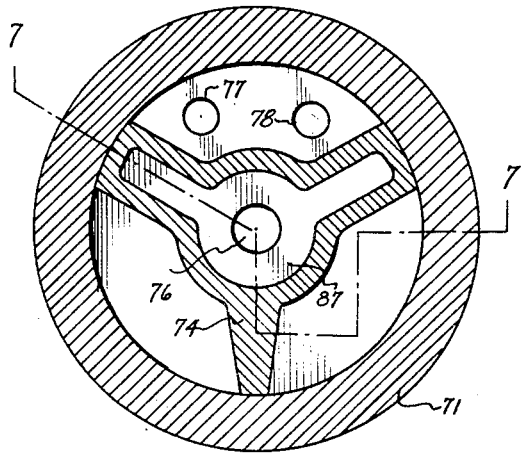

Fig. 6 is a transverse sectional view of the control valve.

Figure 7:
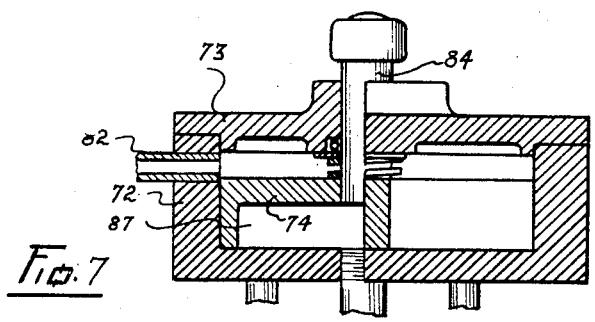

Fig. 7 is a longitudinal sectional view taken on the line 7—7 of Figure 6.

Figure 8:
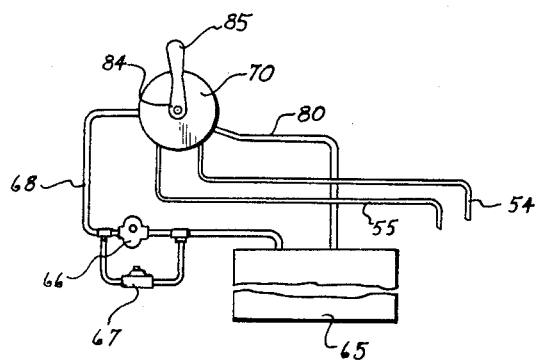

Fig. 8 is a diagrammatic view showing the oil flow to the hydraulic cylinder.

In the drawings like characters of reference indicate corresponding parts in each figure.

The numeral 1 indicates generally the drive shaft of an engine, a flange 2 is secured on the shaft 1 and has secured to it a disk 3 provided with a rim 4 to collectively form a flywheel 5.

In the specification and claims the word "flywheel" will be used to designate the flywheel generally or the disk unless said disk is specifically referred to as the disk 3, since it is obvious that the disk would perform all the necessary functions of the invention without its serving as an engine flywheel.

The disk 3 is provided with a hub 7 having integral therewith a broad flange or piston 8 intermediate its length and said hub having an axial passage 11 and being provided with radial ports 12 and 13 adjacent opposite sides of the piston 8. Slidably mounted upon the hub 7 is a cylinder 15 enclosing the piston 8 and springs 16 of any appropriate type are interposed between the sides of the piston and adjacent end walls of the cylinder to urge the cylinder endwise to centralize the piston therein.

The cylinder 15 is provided with a flange 18 having spaced circumferential lugs 19 defining spaces 20 and carrying a ring 21. The opposing faces, respectively numbered 22 and 23 of the flange 18 and the ring 21 serve as clutch faces and are adapted to engage clutch plates to be hereinafter described. A flange 26 is provided with peripheral lugs 27 which are disposed within the spaces 20 and are secured to the rim 4 of the flywheel 5. By this means the flange 26 which provides opposing clutch faces to the faces 22 and 23 is held at a definite spacing from the flywheel 5 or disk 3 and that the faces 22 and 23 are capable of simultaneous movement, one towards and one away from the flange and that the cylinder 15, the flange 18, the ring 21 and the flange 26 have no rotational movement one to the other. Interposed concentrically between the face 22 and the flange 26 is a clutch disk 28 and interposed between the flange 26 and the ring 21 is another clutch disk 29. A gear housing 32, shown only in part, encloses the parts thus described and a reverse gear transmission generally indicated by the numeral 33.

Figure 1:
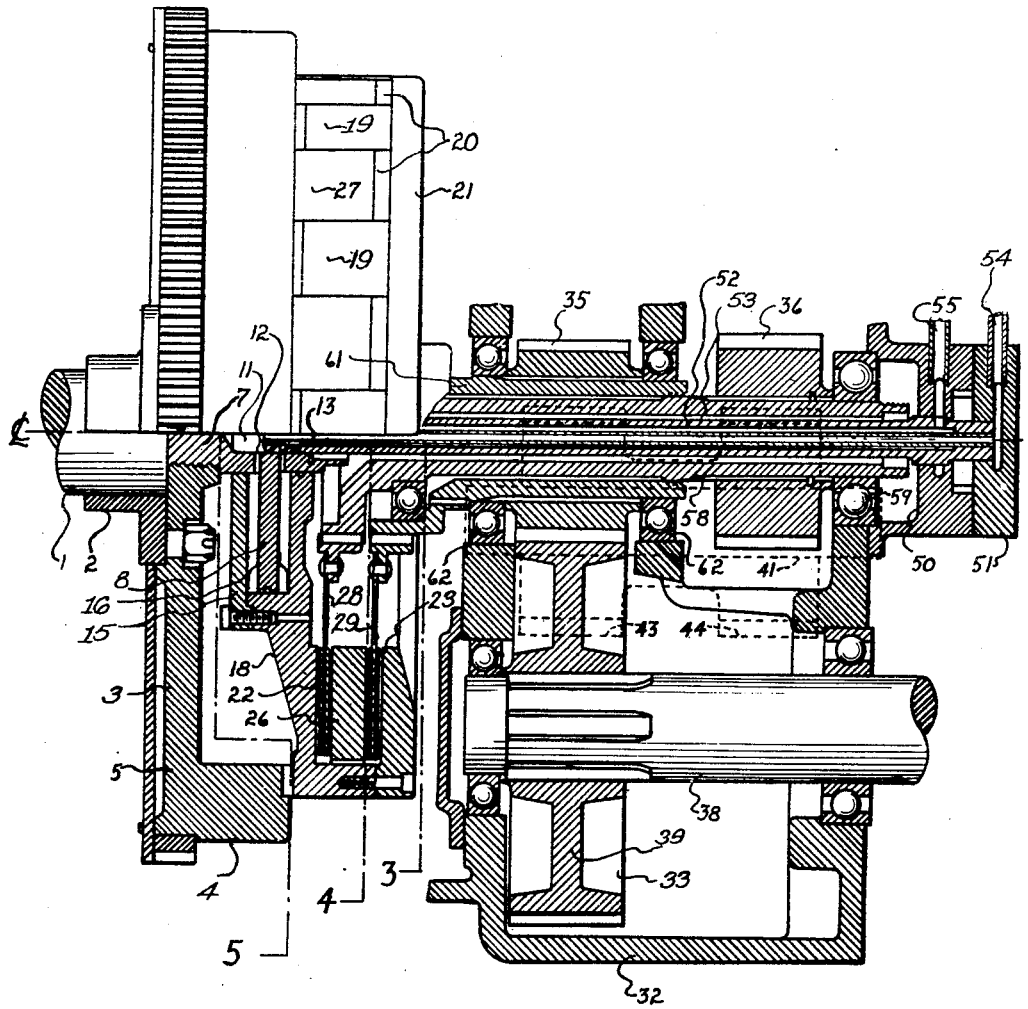
Fig. 1 is a longitudinal sectional view of the invention.

The transmission 33 includes drive pinions 35 and 36, a driven shaft 38 having a gear wheel 39 splined thereon and in mesh with the pinion 35 and an idler shaft 41 upon which sleeve connected gears 43 and 44 are freely rotatable. The gear 44 meshes with the pinion 36 and the gear 43 meshes with the gear wheel 39 of the driven or final drive shaft 38 and all are suitably journalled in bearings supported within the housing 32. The idler shaft its sleeve and gears are shown in dotted lines in Figure 1.

At the outer (right) end of the housing 32 two walls 50 and 51 are provided which support an inner and an outer tube respectively numbered 52 and 53, the inner tube 52 communicating between a hydraulic pressure supply pipe 54 and the ports 12, one only shown, and the left end of the cylinder 15, and the tube 53 communicating between a similar supply pipe 55 and the ports 13 and the right end of the cylinder 15. Appropriate means are provided to prevent fluid passage between the tubes and the ports. Surrounding the tube 53 is a sleeve 58 which is journalled in a bearing 59 and within another sleeve 61. The sleeve 58 is flanged at its inner end to support the clutch plate 28 and is splined adjacent its outer end to receive the pinion 36. The sleeve 61 is journalled in bearings 62 and is flanged at its inner end to support the clutch plate 29, it is also splined between the bearings to receive the pinion 35.

The control of the clutch includes an oil or other hydraulic fluid reservoir 65, a driven pump 66, a spring loaded by-pass 67 back from the pump to the reservoir, and a supply pipe 68 from the delivery side of the pump to a control valve 70. The control valve 70 see Figures 6 and 7 consists of a cylindrical body 71 having a base 72, a cover plate 73 and a valve spider 74. The base 72 is provided with ports 76, 77 and 78 which are adapted for connection respectively to a return pipe 80 leading back to the reservoir, the pipe 55 leading to the outer tube 53 and to the pipe 54 leading to the inner tube 52. There is also a port 82 to which the pipe 68 from the pump is connected. The valve spider 74 is provided with a stem 84 which extends through the cover plate 73 and is fitted with a handle 85 by which the valve 70 is manually controlled. The spider 74 is provided on its underside with a recess which forms a port 87 extending from its axis outwardly so as to enable said recess to register with either of the ports 77 or 78 to allow the fluid from either of the pipes 55 and 54 to return to the reservoir 65.

In operation, the pump 66 is constantly running and when the handle 85 is in neutral position as shown in Figures 6 and 8, the flow of oil is by-passed through the check valve 67 back to the reservoir 65, whilst a constant and equal pressure is applied through the inner and outer tubes 52 and 53 to opposite sides of the piston 8 which remains in a central position on account of the thrust of the springs 15. If the handle 85 is moved to the right to bring the left end of the port 87 into register with the port 77 of the valve 70, the flow from the pump will be through the valve and its port 78, thus allowing the fluid to flow through the port 78, the pipe 54, the inner tube and into the cylinder 15 to the left of the piston 8, thus moving the clutch face 23 to grip the clutch plate 29 between it and the fixed flange 26, causing said clutch plate to rotate the outer sleeve 61 and the pinion 35. The pinion 35 being in mesh with the final drive gear 39 is therefore caused to rotate in an opposite direction to that of the shaft 1.

If the handle 85 is thrown over to cause the port 87 to register with the port 78, the fluid flow to the cylinder 15 will be through the port 77, the pipe 55, the outer tube 53 and the port 13 to bear upon the right side of the piston 8, thus moving the cylinder 15 to the right and causing the flange 18 to grip the clutch plate 28 between it and the fixed flange 26. The rotation of clutch plate 28 will impart similar rotation to the inner sleeve 58 and will through the idler gears 44 and 43 impart rotation to final drive gear 39 in the same direction as the shaft 1.

What I claim as my invention is:

1. A clutch mechanism comprising a flywheel having a hub, said hub having a piston intermediate its length, a cylinder slidable upon the hub and enclosing the piston, a shaft aligned with the hub, said shaft having a driving element non-rotatably secured thereto, a clutch plate secured to said shaft, a flange having a clutch face carried by the flywheel in proximity to the clutch plate, a flange extending from the cylinder non-rotatively coupled to the flywheel, and means for delivering fluid under pressure to the cylinder to move the cylinder flange to engage the clutch plate and drive the shaft.

2. A clutch mechanism comprising a flywheel having a hub, said hub having a piston intermediate its length, a cylinder slidable upon the hub, and enclosing the piston, a shaft aligned with the hub, said shaft having a driving element non-rotatably secured thereto, a clutch plate secured to said shaft, a flange having a clutch face carried by the flywheel in proximity to the clutch plate, a flange extending from the cylinder non-rotatively coupled to the flywheel, and means for delivering fluid under pressure to the cylinder to move the cylinder flange to engage the clutch plate between the cylinder flange and the clutch face of the flywheel flange.

3. A clutch mechanism comprising a flywheel having a hollow hub, a piston surrounding the hub, a cylinder enclosing the piston, said cylinder being slidable along said hub, means for admitting fluid under pressure to the cylinder on either side of the piston through said hollow hub, a flange carried by the flywheel and spaced therefrom, a flange carried by the cylinder having a clutch face opposing the flywheel flange, a ring carried by the cylinder flange in opposing relation to the flywheel flange, a pair of concentric shafts aligned with the hub each adapted to support a driving element, each of said shafts having a clutch disk, one of said disks being disposed for engagement between the cylinder flange and the flywheel flange and the second of said disks being disposed between the flywheel flange and the ring.

4. A clutch mechanism comprising a flywheel having a hollow hub, a piston surrounding the hub, a cylinder enclosing the piston, said hub having a port communicating with opposite sides of the piston within the cylinder, a flange carried by the flywheel and spaced therefrom, a flange carried by the cylinder having a clutch face opposing the flywheel flange, a ring carried by the flywheel flange in opposing relation to the flywheel flange, a pair of hollow shafts journalled in alignment with the hub each adapted to support a driving element, each of said shafts having a clutch disc, one of said discs being disposed for engagement between the cylinder flange and the flywheel flange and the second of said clutch discs being disposed between the flywheel flange and the ring and a pair of concentrically mounted tubes extending through the shafts into the hollow hub to supply activating fluid through the ports to move the cylinder lengthwise of said hub, to selectively engage either of the clutch discs.

5. A clutch mechanism comprising a flywheel having a hollow hub, a piston surrounding the hub, a cylinder enclosing the piston, said hub having a port communicating with opposite sides of the piston within the cylinder, a flange carried by the flywheel and spaced therefrom, a flange carried by the cylinder having a clutch face opposing the flywheel flange, a ring carried by the flywheel flange in opposing relation to the flywheel flange, a pair of hollow shafts journalled in alignment with the hub each adapted to support a driving element, each of said shafts having a clutch disc, one of said discs being disposed for engagement between the cylinder flange and the flywheel flange and the second of said clutch discs being disposed between the flywheel flange and the ring, and a pair of concentrically mounted tubes extending through the shafts into the hollow hub to supply activating fluid through the ports to move the cylinder lengthwise of said hub to selectively engage either of the clutch discs, and means for restoring the cylinder to mid stroke position when pressure is equally applied to both sides of the piston.

FRANK LENDRUM LAWRENCE.

REFERENCES CITED

The following references are of record in the file of this patent:

UNITED STATES PATENTS

| Number | Name | Date |
|---|---|---|
| 1,970,738 | Collins | Aug. 21, 1934 |
| 2,136,811 | Burtnett | Nov. 15, 1938 |
| 2,231,411 | Lawrence | Feb. 11, 1941 |
| 2,291,241 | Lawrence | July 28, 1942 |